United States Patent
Burchett

(10) Patent No.: US 7,198,282 B2
(45) Date of Patent: Apr. 3, 2007

(54) CROSS MEMBER

(75) Inventor: Chad Lee Burchett, Kernersville, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 21 days.

(21) Appl. No.: 10/850,497

(22) Filed: May 20, 2004

(65) Prior Publication Data

US 2005/0082777 A1 Apr. 21, 2005

(51) Int. Cl.
*B62D 53/08* (2006.01)

(52) U.S. Cl. .............. 280/433; 280/438.1; 280/799

(58) Field of Classification Search .......... 280/433, 280/438.1, 495, 656, 789, 795, 796, 799
See application file for complete search history.

(56) References Cited

U.S. PATENT DOCUMENTS

| | | | | |
|---|---|---|---|---|
| 1,397,053 | A * | 11/1921 | Mitchell | 280/438.1 |
| 2,903,275 | A * | 9/1959 | Walther | 280/407 |
| 3,117,772 | A * | 1/1964 | Brown | 267/269 |
| 3,580,611 | A * | 5/1971 | McNitt | 280/433 |
| 5,143,393 | A * | 9/1992 | Meyer | 280/491.1 |
| 5,988,665 | A | 11/1999 | Terry et al. | |
| 2003/0001361 | A1* | 1/2003 | Laarman et al. | 280/433 |
| 2004/0021290 | A1* | 2/2004 | Hicks et al. | 280/438.1 |

FOREIGN PATENT DOCUMENTS

| | | | | |
|---|---|---|---|---|
| DE | 2521835 | * | 12/1975 | 280/438.1 |
| DE | 0319766 | * | 6/1989 | 280/433 |
| FR | 543496 | * | 12/1955 | 280/438.1 |

OTHER PUBLICATIONS

"Fontaine Fifth Wheel" brochure, © 1989.*

* cited by examiner

*Primary Examiner*—Anne Marie Boehler
(74) *Attorney, Agent, or Firm*—Martin Farrell

(57) ABSTRACT

A cross member for a heavy duty over-the-highway tractor having an integral fifth wheel hitch such that the fifth wheel hitch is connected to the cross member rather than to brackets mounted to the frame rails of the vehicle. In one embodiment, the fifth wheel hitch is connected to sliding rails that span two cross members so that the fifth wheel hitch can be positioned at various points between the cross members.

15 Claims, 3 Drawing Sheets

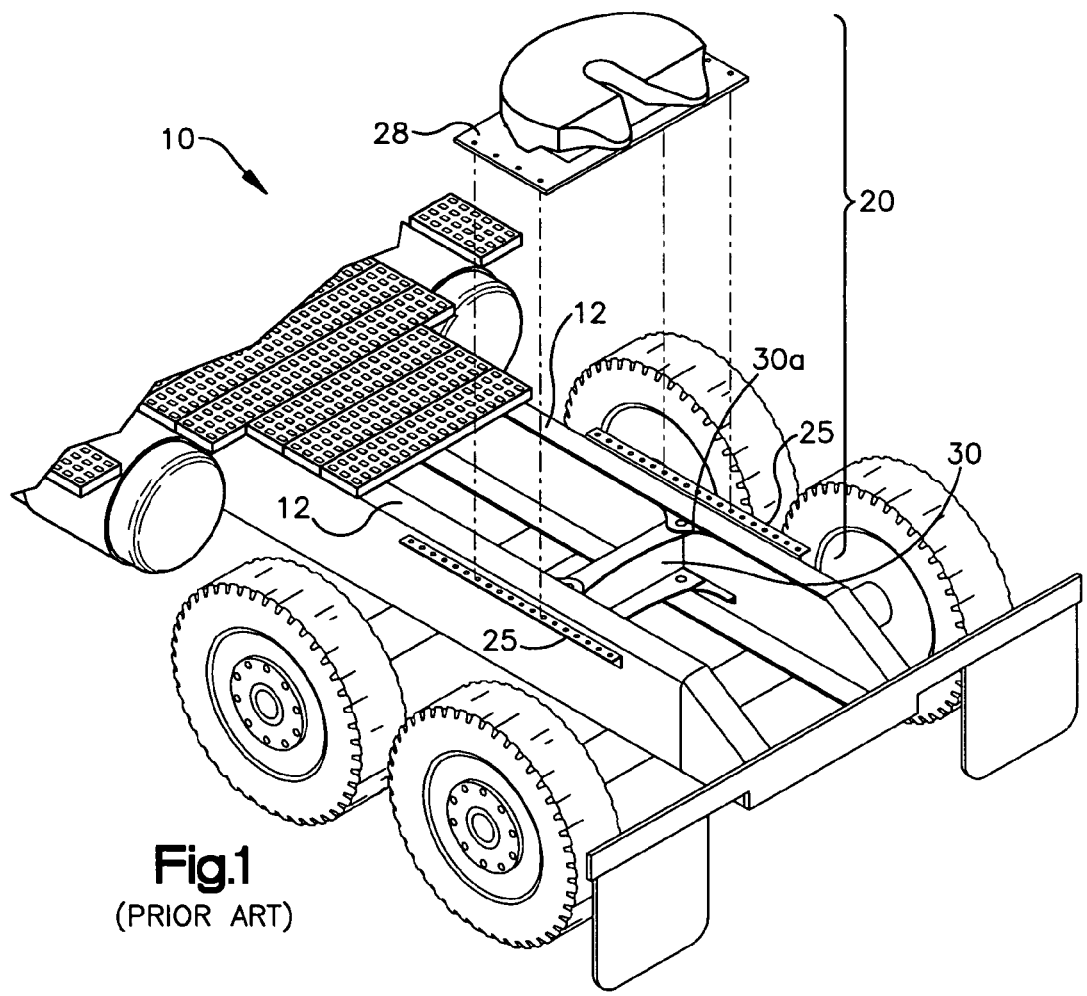
Fig.1
(PRIOR ART)
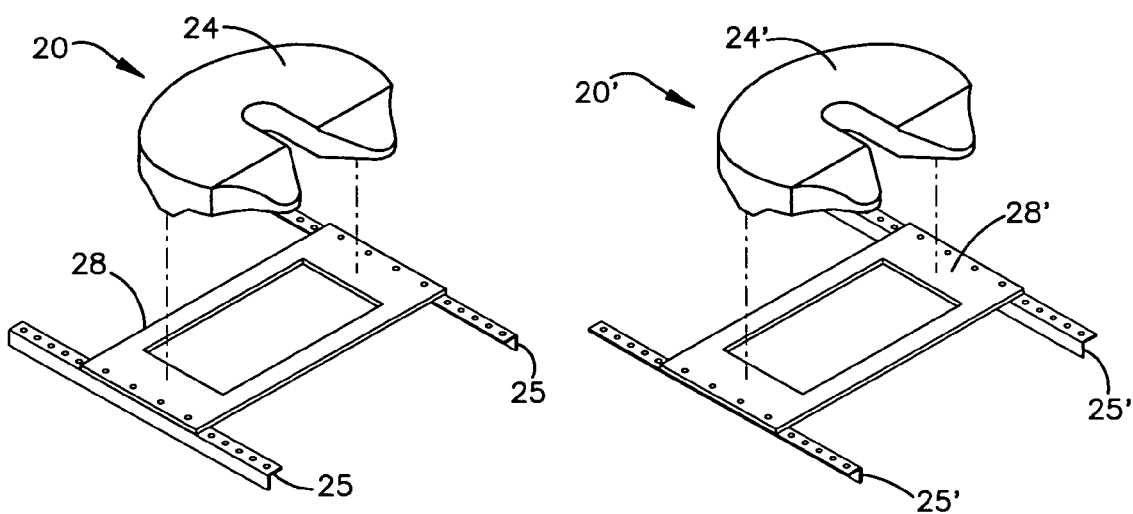
Fig.2A
(PRIOR ART)
Fig.2B
(PRIOR ART)

US 7,198,282 B2

CROSS MEMBER

TECHNICAL FIELD

The invention pertains generally to a cross member for a vehicle having a pair of spaced, parallel frame rails and more particularly to a cross member for a heavy duty truck tractor that carries a trailer.

BACKGROUND OF THE INVENTION

Truck tractors typically feature a fifth wheel hitch for mounting a trailer. Due to the weight of the trailer, the fifth wheel assembly must be supported by the truck frame. The fifth wheel assembly is fairly standard and relatively few methods have been used for securing the fifth wheel to the truck frame rails.

SUMMARY OF THE INVENTION

A chassis cross member that includes a fifth wheel mounting hitch reduces overall vehicle weight by eliminating the need for additional fasteners and brackets and allowing for a smaller fifth wheel top plate surface area.

A cross member assembly is provided for a vehicle having a pair of parallel spaced frame rails extending longitudinally for substantially the entire length of the vehicle. One or more cross members each having first and second frame rail engaging structures are mounted to each of the frame rails. A fifth wheel hitch is connected to the one or more cross members.

The first and second frame rail engaging structures may include top and bottom tie plates and fifth wheel hitch mounting structure that is connected to each top tie plate. The fifth wheel hitch mounting structure may include mounting legs having ears with a clevis configuration that engage each mounting leg and are connected to the mounting leg with a clevis pin.

The fifth wheel mounting structure may include a sliding rail connected to the first frame engaging structures of two cross members and a mounting plate that releasably engages the sliding rail and a mounting leg connected to the mounting plate that is fixed to the fifth wheel hitch. The mounting plate may include retractable teeth that engage notches in the sliding rail to maintain the position of the fifth wheel hitch.

BRIEF DESCRIPTION OF THE DRAWINGS

The present invention is illustrated by way of example and not limitation in the figures of the accompanying drawings, in which like references indicate similar elements and in which:

FIG. 1 is a perspective view of a heavy duty truck tractor illustrating schematically the location of chassis cross members and a prior art fifth wheel hitch;

FIGS. 2A and 2B are perspective views of prior art fifth wheel hitches with their associated mounting hardware;

DETAILED DESCRIPTION OF THE PREFERRED EMBODIMENTS

Figure 3:
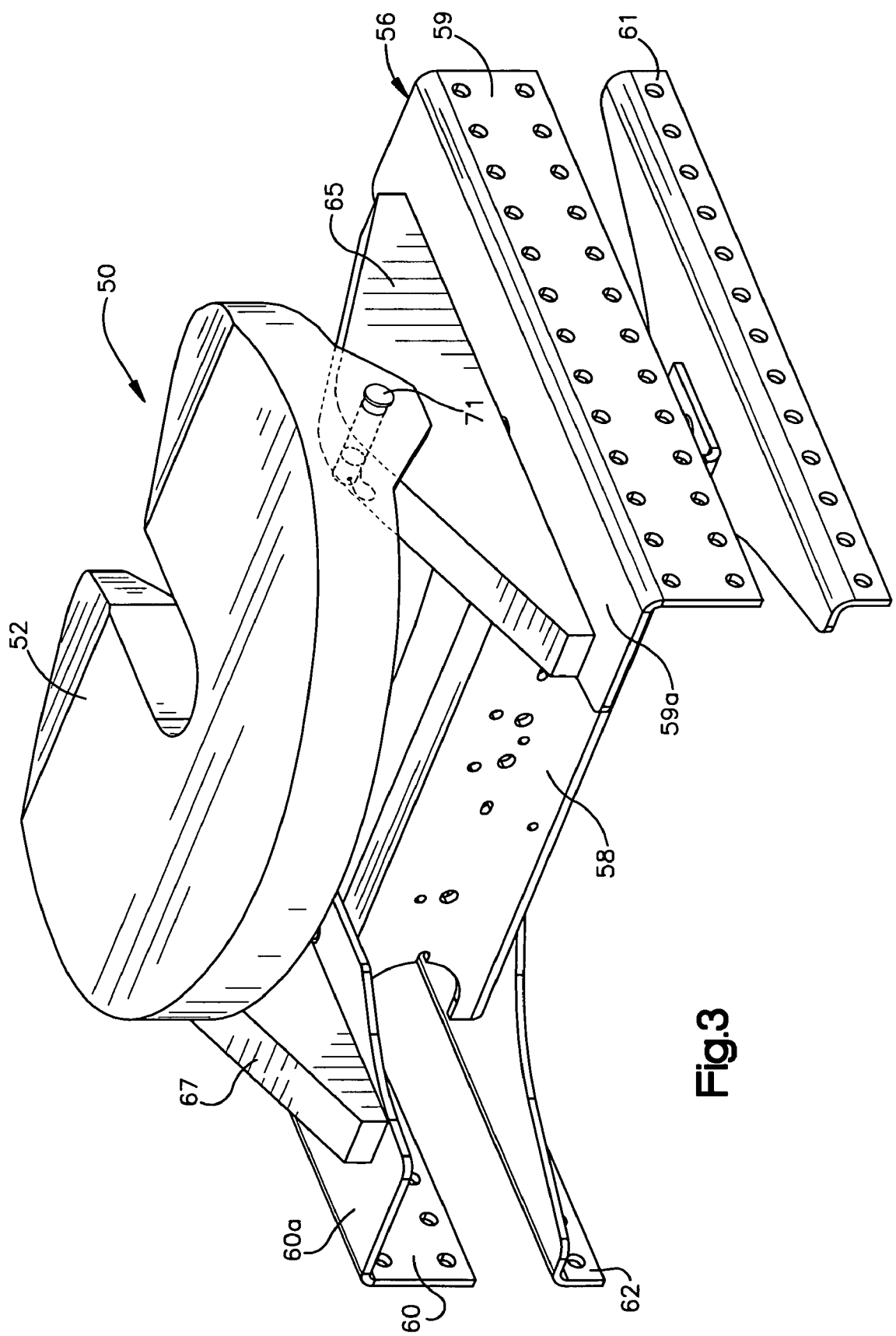
FIG. 3 is a perspective view of a cross member that includes a fifth wheel hitch in accordance with an embodiment of the present invention; and, FIG. 4 is a perspective view of a cross member that includes a moveable fifth wheel hitch in accordance with an embodiment of the present invention.

FIG. 1 shows a generalized view of a heavy duty truck tractor 10 having conventional cross members such as the one labeled 30 for connecting the frame rails 12 to one another and to stiffen the frame against torsional forces encountered by the frame during vehicle operation. A prior art fifth wheel hitch assembly 20 is shown mounted above the rearmost cross member. Fifth wheel hitch top plates are typically mounted to the frame rails of the tractor on mounting plates supported by angle iron brackets so that the frame rails support the weight of the trailer. The mounting plate and angle iron brackets add weight and cost to the design and require fasteners to secure the brackets to the truck frame. Relative to the frame, the angle iron brackets face either inboard or outboard, encroaching on valuable space in the area surrounding the frame rails. In addition, because it is desirable to utilize a relatively lightweight mounting bracket, the contact surface of the fifth wheel top plate must be wide enough to distribute the trailer load adequately and to locate the connection between the fifth wheel top plate and the plate near to the angle iron brackets to avoid damage to the mounting plate.

The prior art fifth wheel assembly 20 includes a fifth wheel hitch top plate 24 mounted on a mounting plate 28 that spans angle iron brackets 25 connected to the frame rails. As discussed above, the surface area of the fifth wheel hitch top plate 24 is in part dictated by the necessity of distributing the weight of the trailer, which is typically up to 50,000 pounds, across the surface area of the bracket 28, which is selected to be as lightweight as possible. In addition, the fifth wheel assembly must support a drawbar load of about 150,000 pounds. Due to its substantial size, a typical fifth wheel hitch top plate weighs approximately 300 pounds and the associated angle iron brackets weigh about 30 pounds.

FIGS. 2A and 2B illustrate in more detail a prior art fifth wheel assemblies 20, 20'. The fifth wheel hitch top plate 24, 24' is welded to the mounting plate 28 which is in turn screwed to the angle iron brackets 25, 25'. FIG. 2A illustrates a mounting configuration in which the angle iron brackets are positioned inboard or between the frame rails. FIG. 2B illustrates a mounting configuration in which the angle iron brackets are positioned outboard of the frame rails. The outboard arrangement of FIG. 2B in particular poses packaging conflicts with other components that are mounted on the outboard surface of the frame rails.

Referring now to FIG. 3, a cross member assembly 50 having an integral fifth wheel hitch is shown. The cross member and fifth wheel hitch assembly 50 includes a modified chassis cross member 56 and a relatively lightweight fifth wheel hitch top plate 52. In the described embodiment, the cross member 56 that includes the integral fifth wheel hitch assembly is the "bogie", or rearmost, cross member of the truck, but other suitably located cross members can include the fifth wheel hitch within the scope of the invention. The cross member 56 features a pair of top tie plates 59,60 and lower tie plates 61,62 attached to distal ends of a center section 58. In this embodiment, the center section 58 has a substantially "C" shaped cross section and is welded, riveted, or bolted to the top tie plates 59, 60 and bottom tie plates 61, 62 and spans a significant portion of the space between the frame rails 12 (FIG. 1). In other embodiments of the invention, the center section may have other appropriate configurations that enable the cross member to support the weight of the trailer. As compared to prior art cross members, the center section 58 is thicker, being approximately 8 mm, thick (compared to 5 mm, for prior art cross members) to enable the cross member to support the weight of the trailer.

The top tie plates 59, 60, have flanged sides that include bolt holes that line up with similar holes within inner channels in the frame rails 12. When the truck is assembled, these holes are utilized to locate bolts that secure the cross member to the frame. To enable the cross member to support the additional weight of the trailer, the top tie in plates 59,60 have additional material on the hitch supporting surfaces. As can be seen in FIG. 1, prior art cross members have a top tie plate 30*a* that has the same configuration as the bottom tie plate, featuring a center section mounting point that tapers out to the frame rail engaging surface. For reference, the bottom tie plates 61,62, shown in FIG. 3 have a similar shape to prior art top and bottom plates. The top tie plates 59, 60, in contrast, have a top mounting flange 59*a* that has significantly more material than the bottom tie plate. The specific configuration of the top tie plate in FIG. 3 is an example of one manner in which the top tie plate can be reinforced to support the weight of the trailer and other suitable configurations will be apparent to one of skill in the art. In the described embodiment, the bottom tie plates 61, 62 have similar weight and geometry to prior art bottom tie plates, but could also be suitably reinforced to support the weight of the trailer within the scope of the invention.

The fifth wheel hitch top plate 52 can be made of stamped or cast metal. The fifth wheel top plate is significantly smaller than the prior art top plate 24 (FIG. 1), but still includes conventional locking mechanisms and accepts a conventional 50 millimeter king pin. The fifth wheel top plate 52 in the described embodiment is about 70% of the size of a prior art top plate, resulting in weight and cost savings. The top plate 52 has a pair of mounting ears having a clevis shape that engages a pilot hole in mounting legs 65,67 with a clevis pin 71. The clevis pin connection advantageously allows for the top plate 52 to pivot about the pin, but in alternative embodiments the top plate could be welded or otherwise fixedly connected to the mounting legs 65, 67. The mounting legs are welded or otherwise suitably connected to the top tie plates 59, 60.

Figure 4:
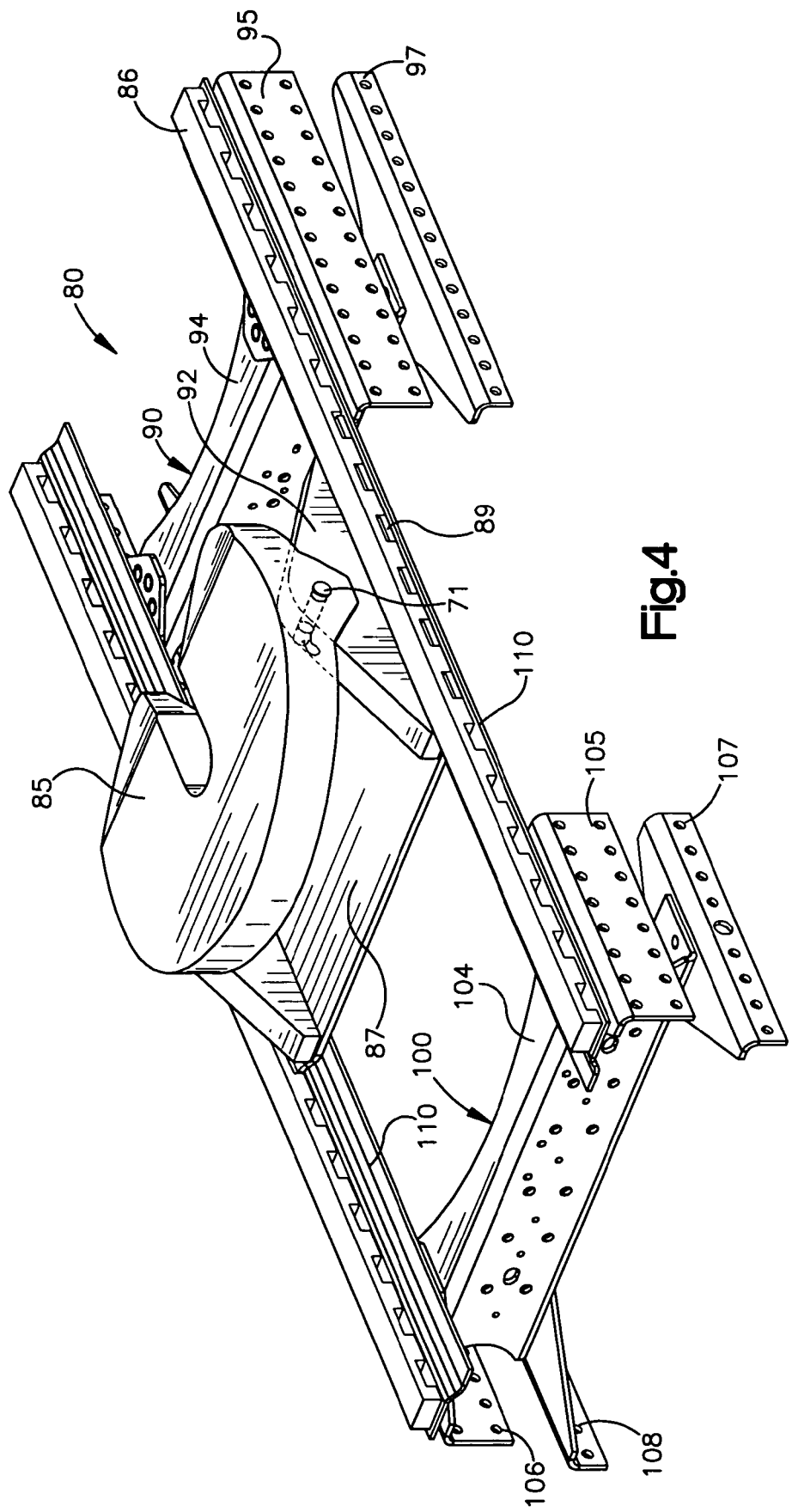

FIG. 4 illustrates another embodiment of the invention, a slideable fifth wheel assembly 80 that includes a pair of adapted cross members 90, 100 which support a slideable fifth wheel hitch 85. Each of the cross members 90, 100 are constructed in a similar manner to that described above including top tie plates 95, 105 and bottom tie plates 97, 107 with center sections 94, 104 spanning the frame rails 12. The top and bottom tie plates are connected to the frame rails as described above. The manner in which the various cross member components are reinforced may differ from that discussed in conjunction with FIG. 3 because two cross members share the load of the trailer. Suitable cross member component reinforcing techniques will be apparent to one of skill in the art.

A sliding rail flange 110 spans the top tie plates of each cross member, and is suitably welded to each top tie plate. A notched sliding rail 86 is mounted on top of each sliding rail flange 110. The flange 110 curves upward as it extends away from the top tie plate to create a space for the frame rail (not shown) to fit between the flange 110 and the top tie plates 95, 105, 106 so that the flange rests on the frame rail when the cross member is installed. In this manner the slideable fifth wheel cross member assembly is self contained and engages the frame rails in the same manner as conventional cross members, without requiring additional mounting hardware for the fifth wheel assembly.

The slideable fifth wheel hitch 85 is connected to mounting legs 92 with a similar clevis pin arrangement as discussed with respect to FIG. 3. The mounting legs 92 are welded to a slide plate 87 that spans the flanges 110. The slide plate 87 has retractable teeth 89 on its edges that engage the notches in the sliding rails 86. To position the fifth wheel hitch, the teeth can be retracted by actuating a mechanical or pneumatic mechanism, moving the hitch to the desired position, and releasing the teeth to engage the rails 86 and maintain the fifth wheel hitch in position.

The present invention has been described with reference to a heavy duty truck tractor, however it is contemplated that the invention can be practiced on any vehicle having a pair of parallel spaced frame rails. Upon review of the description it will be evident that various modifications and changes may be made thereto without departing from the broader spirit or scope of the present invention as defined in the appended claims. The specification and drawings are, accordingly, to be regarded in an illustrative rather that a restrictive sense.

I claim:

1. A cross member assembly for a vehicle having a pair of parallel spaced frame rails extending longitudinally for substantially the entire length of the vehicle, the cross member assembly comprising:
   two cross members, each comprising a center section and top and bottom tie plates at opposing ends of the center section for mounting to each of the frame rails, the center section being vertically disposed between first and second frame rail engaging structures; and
   a fifth wheel hitch assembly comprising a fifth wheel hitch and fifth wheel mounting structure;
   wherein the fifth wheel mounting structure is mounted to each top tie plate, and the fifth wheel mounting structure further comprises a sliding rail connected to top tie plates of the two cross members.

2. The cross member assembly of claim 1, wherein the fifth wheel mounting structure comprises mounting legs and wherein the fifth wheel hitch has ears with a clevis configuration that engage each mounting leg and are connected to the mounting leg with a clevis pin.

3. The cross member assembly of claim 1 wherein the fifth wheel mounting structure further comprises a mounting plate that releasably engages the sliding rail and a mounting leg supporting the fifth wheel hitch and connected to the mounting plate.

4. The cross member assembly of claim 3 wherein the mounting plate comprises retractable teeth that engage notches in the sliding rail to maintain the position of the fifth wheel hitch.

5. A heavy duty truck comprising:
   a pair of spaced, parallel frame rails supporting an engine compartment and operator cab;
   at least one cross member assembly connected to each of the frame rails at distal ends of the cross member assembly, wherein each cross member assembly comprises a center section vertically disposed between the frame rails and a top tie plate connected at a top of each distal end of the center section, each top tie plate engaging a frame rail; and
   a fifth wheel hitch assembly connected to the top tie plates such that the only connection between the fifth wheel hitch assembly and frame rail is through the cross member.

6. The heavy duty truck of claim 5 wherein the fifth wheel hitch assembly comprises a hitch plate adapted to engage and releasably retain a trailer, a mounting leg supporting the hitch plate and connected to the top tie plate, the hitch plate having a clevis configuration that engages a coacting clevis pin assembly on the mounting leg.

7. The heavy duty truck of claim 5 wherein the fifth wheel hitch assembly further comprises a sliding rail that is connected to a first distal end of two cross member assemblies and a hitch plate that is mounted for sliding movement between the two cross member assemblies on the sliding rail.

8. The heavy duty truck of claim 7 wherein the fifth wheel hitch assembly further comprises a mounting plate that supports the fifth wheel hitch and releasably engages the sliding rail.

9. The heavy duty truck of claim 7 further comprising a second sliding rail connected to a second distal end of the two cross member assemblies.

10. The heavy duty truck of claim 7 wherein the fifth wheel hitch assembly comprises a hitch plate adapted to engage and releasably retain a trailer and a mounting leg supporting the hitch plate, the hitch plate having a clevis configuration that engages a coacting clevis pin assembly on the mounting leg.

11. The heavy duty truck of claim 7 wherein the at least one cross member assembly further comprises bottom tie plates and fifth wheel hitch mounting structure that is connected to each top tie plate.

12. The heavy duty truck of claim 11 wherein the fifth wheel hitch mounting structure comprises mounting legs and wherein the fifth wheel hitch includes ears with a clevis configuration that engage each mounting leg and are connected to the mounting leg with a clevis pin.

13. A cross member assembly with an integrated fifth wheel hitch assembly for a vehicle having a pair of parallel spaced frame rails extending longitudinally for substantially the entire length of the vehicle, comprising:
   a cross member assembly comprising:
      at least one center section;
      top and bottom tie plates attached to opposite ends at top and bottom portions of the at least one center section, the top tie plates including a center section flange connected to the center section and a frame rail flange for mounting to the frame rails; and
   a fifth wheel hitch assembly comprising:
   a fifth wheel hitch; and
   fifth wheel mounting structure for mounting the fifth wheel to the cross member assembly, wherein the fifth wheel mounting structure is connected to the center section flange of the top tie plate.

14. The cross member assembly of claim 13, wherein the fifth wheel mounting structure comprises a sliding rail connected to the top tie plate center section flange.

15. The cross member assembly of claim 13, wherein the cross member assembly is configured to mount between frame rails, the frame rail flanges of the top tie plates and bottom tie plates being mountable on inner channels of the frame rails.

* * * * *